March 30, 1926. Re. 16,299

J. SCHADE

BOOK COVER

Original Filed April 28, 1925

Inventor
John Schade
by J. W. Fowler
Attorney

Reissued Mar. 30, 1926. Re. 16,299

UNITED STATES PATENT OFFICE.

JOHN SCHADE, OF HOLYOKE, MASSACHUSETTS, ASSIGNOR TO NATIONAL BLANK BOOK COMPANY, OF HOLYOKE, MASSACHUSETTS, A VOLUNTARY TRUST ASSOCIATION OF COPARTNERSHIP: F. B. TOWNE, E. S. TOWNE, J. M. TOWNE, AND F. W. WILSON, TRUSTEES.

BOOK COVER.

Original No. 1,556,721, dated October 13, 1925, Serial No. 26,371, filed April 28, 1925. Application for reissue filed February 4, 1926. Serial No. 86,093.

*To all whom it may concern:*

Be it known that I, JOHN SCHADE, a citizen of the United States, residing at the city of Holyoke, county of Hampden, and State of Massachusetts, have invented certain new and useful Improvements in Book Covers; and I do declare the following to be a full, clear, and exact description of the invention, such as will enable others skilled in the art to which it appertains to make and use the same.

This invention relates to loose leaf binders, but more particularly has reference to the securing of the loose leaf holding structure to the book cover.

The object of the invention is to secure said structure to the cover without stitching it in position, or employing adhesive substance, or perforating the cover or forming closed pockets in the back of the latter.

The description and claims which form a part of this application are to be considered in connection with the accompanying drawing, which illustrates the manner in which the invention is preferably utilized, and in which—

Similar numerals of reference denote like parts in the several figures of the drawing.

The book covers to which this invention relates are made of leather or any other suitable material adapted for the carrying out of such invention.

Figure 1:
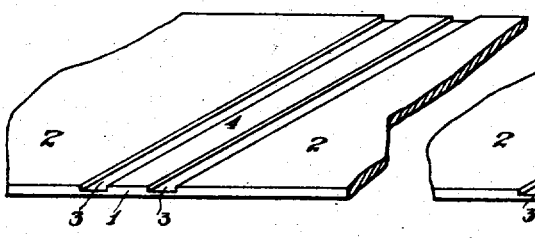
Figure 1 is a broken perspective view of a book cover, as it appears after the first step has been taken in carrying out the invention.
Figure 2:
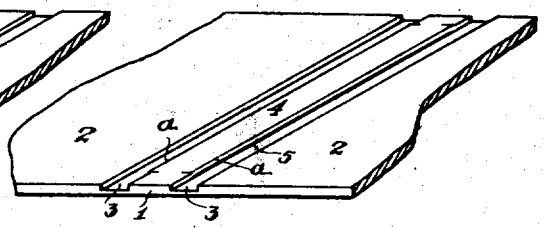
Figure 2 is a similar view showing the appearance of the cover after the second operation.

Referring to the drawings, 1 represents the back of the cover and 2 the side covers, channels 3 being cut throughout the length of the cover between the back and side covers for two reasons, first, in order that the side covers may be readily closed and opened, and second, in order to form at the inside of the back a raised ridge or strip 4 extending the full length of the back so that the partially formed book cover may have the appearance shown at Figure 1.

Slits 5 are then made within the opposite side edges of this ridge 4 which slits extend lengthwise of said ridge and parallel with the face thereof and are of any suitable depth so as to provide free edges *a*.

6 is a metal sheath of a length substantially that of the slits 5 and having its side edges bent downwardly and inwardly to form flanged portions 7, while from the face of this sheath spurs 8 are lanced which project upwardly.

Figure 3:
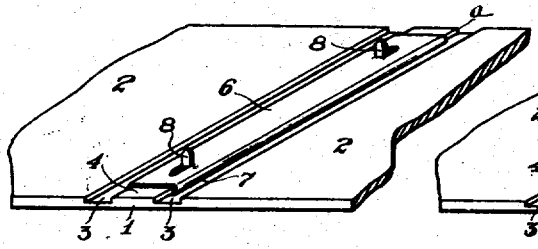
Figure 3 is also a similar view, illustrating the cover as it appears after the third step has been taken.
Figure 4:
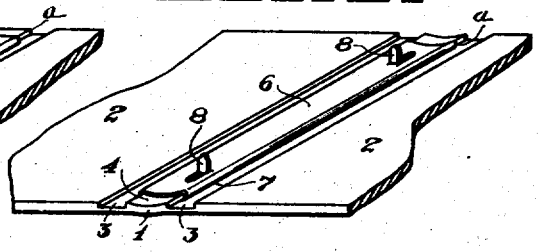
Figure 4 is likewise a similar view, showing the completed cover as it appears after the last step in its construction has been taken, preparatory to securing the cover to the leaf holding structure.
Figure 5:
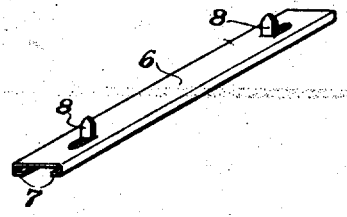
Figure 5 is a detail perspective view of the metal sheath.
Figure 6:
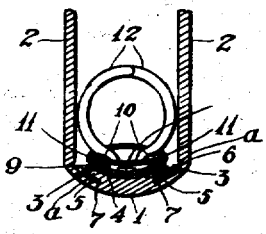
Figure 6 is a cross section showing a loose leaf book equipped with this invention.
Figure 7:
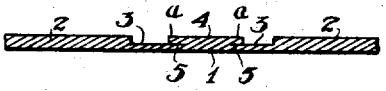
Figures 7 and 8 are cross sections of the constructions shown respectively at Figures 2 and 4.
Figure 8:
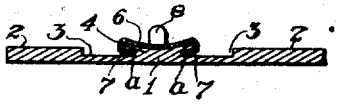

This sheath is assembled on top of the ridge 4 with the flanged portions 7 extending within the slits 5, so as to embrace the edges *a*, as shown at Figure 3, and the said sheath and flanges, and the edges *a* contained between them, are then bent upwardly throughout their length, which operation of bending will clamp said edges firmly between the sheath and flanges, and will also give the entire structure so bent, an arcuate shape in cross section, so that it will be readily adapted to the bottom plate of the leaf holding structure, as will now be described.

It is not deemed necessary herein to enter into any detailed description of the construction and function of the bottom plate of a loose leaf structure, and therefore said plate and the remaining parts of such structure will merely be designated by numerals of reference, since the loose leaf structure is of the usual type and, moreover, the present invention is not limited to its association with any particular kind of loose leaf structure so long as the latter contemplates the use of a bottom plate.

The bottom plate of the loose leaf structure that is shown herein is designated by the numeral 9 and this plate is placed on top of the metal sheath 6, curved in the manner above described, so that said plate will closely conform thereto, and the spurs 8 project from the sheath through suitable openings in the plate and are then firmly clinched down thereby securing the plate to the sheath.

The plate at its upper edges has the usual inwardly turned extending parts 10 which house the outer edges of the usual hook plates 11 which latter carry the circular abutting leaf holding members 12.

While the slits 5 are not shown extending through the ends of the ridge nevertheless they may be extended through one or both of the ridge ends, this being a matter of mere detail. In some instances these slits would extend through one or both ends of the ridge and the metal sheath would then be slid into position, and the bending upwardly of the sheath would cause the side edges of the ridge to be tightly clamped so that the sheath would not become accidently displaced, or the ridge may be stitched across the ends. But, as above stated, these are matters of mere detail and have nothing whatever to do with the actual invention.

In instances where the leather forming the cover is comparatively thin, the ridge 4 may be a separate strip that is stitched throughout its length at its central portion to the inside of the back 1, so as to provide the lateral portions of the ridge to which the metal sheath is secured, and therefore it is not necessary that the ridge should be integral with the back, the invention consisting in providing the ridge and forming its lateral edges so that they may be engaged by the flanged parts 7, the channels 3 being necessary or not according to the thickness of the cover.

What is claimed is:—

1. A book cover for a loose leaf structure, comprising a single piece of material forming the side covers and back, a ridge extending lengthwise of the inside of said back and having lateral free edges, and a metal sheath upon the face of this ridge and secured to said edges.

2. A construction as in claim 1, in which the metal sheath has along its sides inturned flanges which extend beneath the lateral edges of the ridge and are clamped thereto, said sheath provided with means for attachment to a loose leaf structure.

3. A book cover for a loose leaf structure, comprising a single piece of material having longitudinal channels extending throughout the length of the book between the back portion and the cover portions, whereby a ridge is formed constituting the inner face of the back portion, said ridge having slits formed in its opposite side edges, and a metal sheath upon the face of this ridge and having inturned flanges extending within said slits and provided with means for attachment to a loose leaf structure.

4. A construction as in claim 3, in which the metal sheath and the side edges of the ridge embraced by said sheath are bent upwardly so as to be arcuate in cross section.

5. The hereindescribed book cover, comprising integral back and cover portions having therebetween longitudinal channels whereby the thickness of the cover is reduced along the inner extremities of the side covers and the inner face of the back portion formed into a ridge-like structure, the latter having its side edges slit parallel with the face of the ridge, and a metal sheath equipped for attachment to a loose leaf structure and having downwardly and inwardly extending flange portions that are housed within said slits, said sheath with its flanges being curved upwardly in cross section with the upper side edges of the ridge therebetween.

Signed at Holyoke, Hampden County, Massachusetts, this twenty-seventh day of January, 1926.

JOHN SCHADE.